Sept. 6, 1932.  S. A. STEERE  1,875,517

CORD FABRIC

Filed Sept. 25, 1930

Inventor
Samuel A. Steere
By
Bee & Bush
Attorneys

Patented Sept. 6, 1932

1,875,517

UNITED STATES PATENT OFFICE

SAMUEL A. STEERE, OF AKRON, OHIO, ASSIGNOR TO THE GOODYEAR TIRE & RUBBER COMPANY, OF AKRON, OHIO, A CORPORATION OF OHIO

CORD FABRIC

Application filed September 25, 1930. Serial No. 484,290.

This invention relates to cord fabrics and it has particular relation to such fabrics as those employed in the construction of breaker strips for pneumatic tires.

The object of the invention is to provide a breaker strip for pneumatic tires which possesses a higher degree of resiliency and extensibility than the fabrics which have heretofore been employed in that capacity.

In the construction of pneumatic tires for vehicles, a carcass is ordinarily constructed of a plurality of plies of relatively heavy cord fabric. This carcass constitutes a strain resisting member which prevents excessive expansion of a tire by the pneumatic pressure imposed against the walls thereof by an inflated inner tube. In order to resist wear or abrasion, this cord carcass is covered with a relatively heavy layer of tough, wear-resistant rubber compound termed a "tread element."

During service upon the vehicle wheels, the outer layer of rubber is exposed to relatively heavy pounding upon inequalities in the road surface. Therefore, in order to prevent loosening of the covering or rubber tread portion from the carcass, it is customary to dispose one or more plies of very heavy cord material encased within a cushion of relatively soft elastic rubber compound and termed a "breaker strip" upon the carcass between the latter and the tough relatively stiff tread material. This breaker strip constitutes a cushion which permits slight movement between the tread element and the tire carcass and also serves more uniformly to distribute the thrust of small objects upon the roadway over which the vehicle is traveling, to various portions of the carcass. The tendency of separation between the carcass and the tread is thus materially reduced.

As heretofore constructed, the breaker strips have been composed of heavy cords. These cords may consist of 23's yarns spun in groups of five to form strands, which in turn were twisted in groups of 3 to form the cords. The term "23's," as here employed, indicates that twenty-three units of yarn constitute a pound. As applied to cotton cord, each unit of yarn is eight hundred forty yards in length. The cords so formed were fabricated into breaker strip fabric by arranging them in parallel relation and cross-connecting them by means of very weak threads called "picks" which serve to bind them into a sheet during the process of forming the fabric into breaker strips and assembling the latter into tires. The fabric so constructed was not entirely satisfactory in actual service because sharp indentations into the tires, resulting from contact of the tires with stones or other relatively sharp objects frequently caused breaking of the cords in certain localized areas because of the fact that there was insufficient elasticity in the cords.

It has heretofore been proposed to overcome this defect by so increasing the elasticity of the cords constituting the breaker strip that they would stretch materially without breaking. One method proposed for accomplishing this result consists in crimping the fabric by some convenient means in such manner as to impart small waves or sinuations to the cords. These sinuations permit slight extensions of the cords without localized rupture.

This invention consists in the provision of a fabric in which heavy sinuous warp cords are so interspersed with relatively straight filler cords that a desired degree of crimp is permanently imparted thereto thereby securing a highly elastic breaker strip fabric which is well adapted to withstand indentations and pounding from the irregularities in the road without rupture.

For a better understanding of the invention, reference may now be had to the accompanying drawing, forming a part of the specification, in which.

Figure 1:
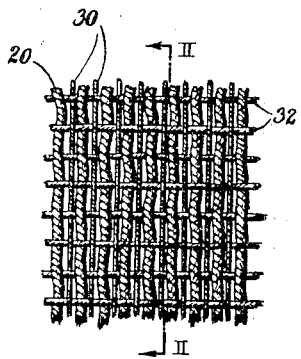
Fig. 1 is a fragmentary plan view of cord breaker fabric which is constructed according to this invention.
Figure 2:
Fig. 2 is a cross-sectional view taken substantially on the line II—II in Fig. 1.
Figure 6:
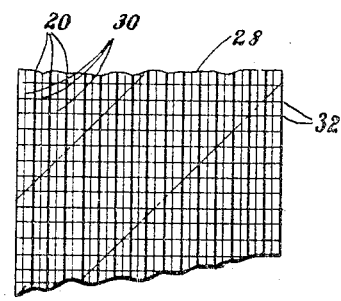
Fig. 6 is a fragmentary plan view of a strip of breaker fabric which has been cut upon a bias preparatory to incorporation into a tire.
Figure 8:
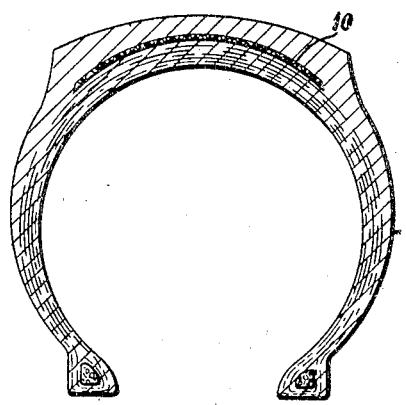
Fig. 8 is a cross-sectional view of a completed tire embodying the new type of breaker strip.

A breaker strip 10 manufactured in accordance with the form of the invention disclosed in Figs. 1 and 2 of the drawing, is composed of a plurality of heavy warp cords 20 which, for purposes of illustration, may be "23's" yards 22. The yarns in turn are twisted in groups of five to form strands 24 which are again twisted in groups of three to form the cords or cables 20. The cords 20 may then be arranged in such spaced relationship in the breaker fabric as to have a count of 13 per inch. In order to insure adequate crimp and to maintain the crimp in the cords 20 during the process of coating fabric with gum and subsequently cutting fabric into bias cut strips 28 indicated in Fig. 6, relatively light cords or strands 30 are disposed between adjacent cords 20. During the process of weaving the heavy cords are maintained under but slight tension while the lighter cords 30 are maintained under considerable tension during weaving. These heavy cords 20 and light cords 30 are interconnected into a woven fabric by means of filler cords 32 which, like the cords 30, are of materially lighter and weaker structure than the heavy cords 20. These warp cords 30 may be formed of strands consisting of three "23's" yarns, while the filler cords 32 may be composed of four "23's" yarns twisted together in conventional manner.

The count per inch of the cords 30 obviously is the same as that of the cords 20. However, the count of the filler cords 32 may be varied as desired. For example, for one convenient type of breaker fabric it may be approximately 10 cords per inch. It is to be understood that these various values are merely illustrative and are not to be considered as limiting the invention. It is, of course, quite possible to vary both the size and the spacing of the various cords at will in order to produce a fabric of any desired strength and weight.

The arrangement of the various cords in the fabric may also be varied somewhat without departing from the spirit of the invention. For example, in the embodiment of the invention disclosed in Fig. 1, the filler cords 32 do not alternately pass over and under the heavy warp cords 20 but instead the cords traverse the entire width of the fabric upon the same side of all of the cords. Likewise, the light warp cords 30 are traversed in similar manner. However, it will be noted that the warp cords 30 cross the filler cords 32 upon opposite sides from the warp cords 20. The various cords are thus interlocked to form a woven fabric.

Figure 3:
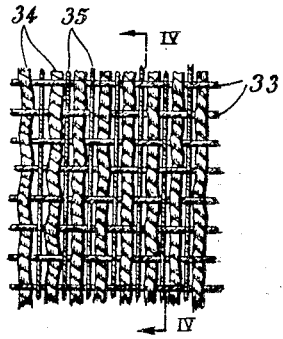
Fig. 3 is a fragmentary plan view of fabric embodying a second form of the invention.
Figure 4:
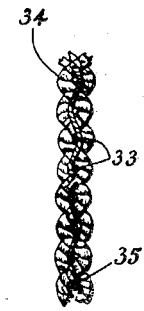
Fig. 4 is a cross-sectional view taken substantially on the line IV—IV of Fig. 3.
Figure 7:
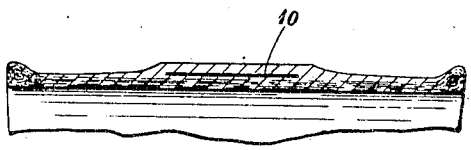
Fig. 7 is a fragmentary cross-sectional view of a flat built tire band in which an improved breaker strip is incorporated.

In the form of the invention disclosed in Figs. 3 and 4, the filler cords 33 are interwoven with heavy warp cords 34 extending alternately over and under the latter throughout the width of the fabric. The filler cords 33 are then interwoven in similar manner with the light warp cords 35. Although in both embodiments of the invention just discussed, each main or heavy cord is separated from the adjacent cord by means of a light cord, it is to be understood that the invention is not limited to this specific construction. For example, it is possible to employ a single light cord for a group of two or more heavy cords or it might even be desirable, under some circumstances, to employ two or more relatively light cords between each pair of cords.

Figure 5:
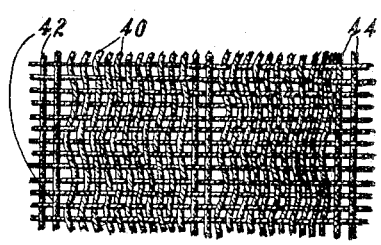
Fig. 5 is a fragmentary plan view of fabric embodying a third form of the invention.
Figure 9:
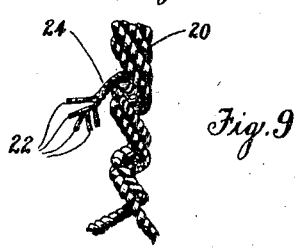
Fig. 9 is a fragmentary elevational view showing in detail a type of cord which may be used in constructing a tire fabric.

In the embodiment of the invention disclosed in Fig. 5, all of the warp cords are of relatively strong construction and may all be of the same size and strength. However, the major portion of the cords are maintained under little or no tension during the process of weaving. By reason of the lack of tension, these cords 40 contain numerous sinuations or flexures 42 which impart the desired degree of extensibility to the fabric. These sinuations are maintained in the fabric by means of a relatively few substantially straight cords 44 which may conveniently be incorporated into the fabric in that condition by maintaining them under considerable degree of tension during the process of weaving. The cords 44, like the cords 30, probably are broken during service in a tire.

It is manifest that substantially any desired degree of extensibility may be imparted to the fabric merely by regulating the relative tension upon the sinuous cords 40 and the straight cords 44. The relative number of straight and sinuous cords may of course be varied at will. In general, it is only necessary to use a sufficient number of straight cords to prevent breakage during the process of calendering the stock. In actual practice it is found that excellent results may be obtained by use of groups of twelve sinuous cords alternating with groups of two straight cords.

The filler cords 46 of the fabric employed to bind the warp cords 40 and 44 together into a fabric like the cords 32 are of relatively light construction and have only sufficient strength to hold the cords 44 together as a fabric while they are being manipulated in the factory.

The fabrics manufactured according to this invention are coated with rubber compound and cut upon a bias at an angle preferably of approximately 45°. The relatively short strips of fabric thus formed may be spliced together to form a continuous strip from which sections of proper length for the formation of breaker strips may be severed.

In the manufacture of tires, two or more plies of fabric are superposed upon each other in such manner that the cords cross each other approximately at right angles thereby insuring adequate tensile strength in the fabric, both with respect to longitudinal and transverse strains. The breaker strips are superposed upon a tire carcass and the ends thereof may then be spliced together in any convenient manner. Since the steps of coating the fabric with rubber compound and severing the coated material into bias units does not constitute a portion of the present invention, they have not been described in detail. Likewise, and for the same reason, a complete description of the specific steps of assembling the breaker strips into completed tires has been omitted.

In the breaker strip fabric disclosed by Figs. 1 and 3, the relatively light warp cords 30 or 35, because of their small diameter and because of the tension maintained thereon during weaving, are only slightly crimped by reason of the fact that they extend alternately under and over the filler cords 32 or 33. On the other hand, the heavy warp cords 20 or 34, because of their relatively large diameters and because of the lack of tension maintained thereon during weaving, are deflected from the straight path to a much greater degree than the lighter cords. Therefore, the heavy cords 20 are more sinuous or are crimped to a greater extent than the lighter cords. The cords 30 are of such strength that they break readily in service but they resist rupture during the process of coating the fabric and stitching the latter to the tire carcass. In the form of the invention disclosed in Fig. 5, the cords 44 perform substantially the same function as cords 30.

Retention of the crimp is thus insured by the relatively straight warp cords even after assembly of the fabric into the tires. After vulcanization of the latter, the vulcanized rubber compound in which the cords are embedded is permanently set about the cords and insures the retention of the crimp in the sinuous cords 20 or 34 even though the straight cords may be broken by reason of impacts from irregularities in the road surface over which the tires travel. The crimp in the fabric insures a certain degree of extensibility in the cords which constitute the tension members in the tire and thus permit a considerable degree of extensibility under the action of severe local flexure of portions of the carcass. The strain thus imparted to localized sections is more uniformly cushioned and transmitted to the main body of the tire carcass thereby materially reducing the tendency of the rubber covering upon the carcass to separate from the latter and also preventing local rupture of the sinuous cords in the breaker strip.

It is well known that tire carcasses, after being used for a short time upon the road, tend to stretch slightly and enlarge because of a certain degree of yield in the cords constituting the carcass. Where ordinary uncrimped breaker strips consisting of relatively unyielding inelastic fabric are employed, this stretching or yielding of the carcass results in the placing of an excessive tensional load upon the breaker strip. In a tire in which a breaker strip embodying the improvements disclosed in the present application is employed, the crimp in such breaker strips permits a slight elongation of the latter upon the stretching of the tire carcass and thus prevents excessive tension being set up in the cords constituting the breaker strip fabric.

It is of course to be understood that the invention is not limited to use in connection with breaker strips, but it may also be extended in its application to the manufacture of fabrics constituting the body of the tire carcass.

Although I have illustrated and described only the preferred embodiments of the invention, it will be apparent to those skilled in the art that the invention is not so limited but that various modifications may be made therein without departing from the spirit of the invention or from the scope of the appended claims.

What I claim is:

1. A breaker strip fabric composed of alternately heavy and light cords, the light cords being initially under tension and the heavy cords being initially free from tension.

2. A breaker strip fabric composed of a warp comprising initially untensioned heavy cords interspersed with initially tensioned light cords and a filler of relatively light cords.

3. A tire carcass embodying a peripherally extending ply of fabric comprising initially untensioned heavy cords alternating with initially tensioned light cords interwoven with light transverse filler cords.

4. A fabric for use in pneumatic tires comprising sinuous cords interspersed with relatively straight cords, the straight cords being adapted initially to withstand the tensile strains during the fabric processing and tire-building operations, and the sinuous cords being adapted to take the deflection loads in the tire.

5. A tire including as an element, a ply of fabric comprising straight cords interspersed with sinuous cords whose general path is parallel to the straight cords, said sinuous cords being adapted to take the deflection loads in the tire while permitting a predetermined degree of elongation beyond the breaking point of the straight cords.

In witness whereof, I have hereunto signed my name.

Signed at Akron, in the county of Summit and State of Ohio, U. S. A., this 22 day of September, 1930.

SAMUEL A. STEERE.